(No Model.) 2 Sheets—Sheet 2.
W. P. & O. MARSHALL.
TOBACCO HILLER.
No. 483,567. Patented Oct. 4, 1892.
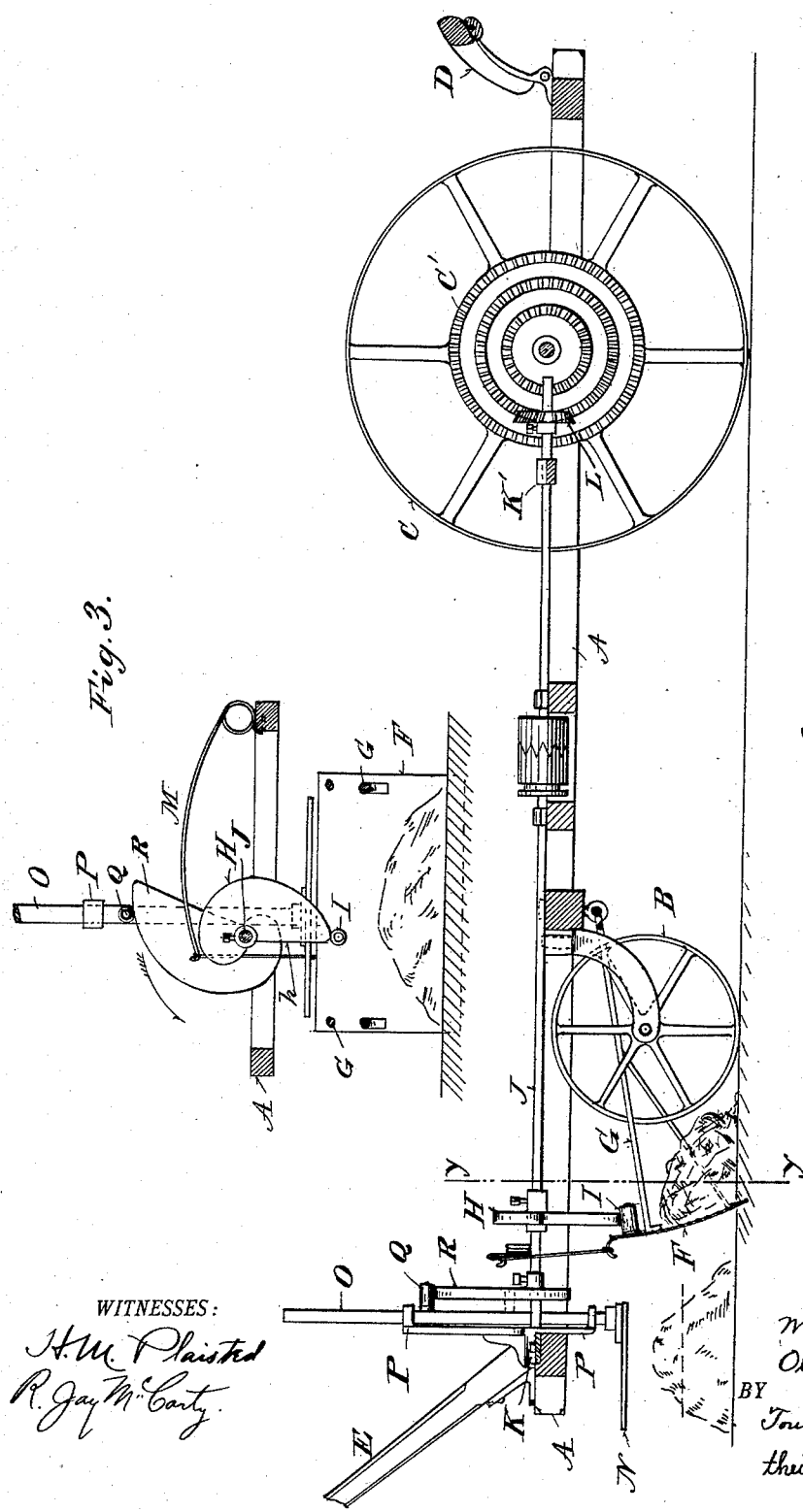
WITNESSES:
H. M. Plaisted
R. Jay McCarty
INVENTORS
William P. Marshall.
Oliver Marshall.
BY Toulmin & Toulmin
their ATTORNEYS.

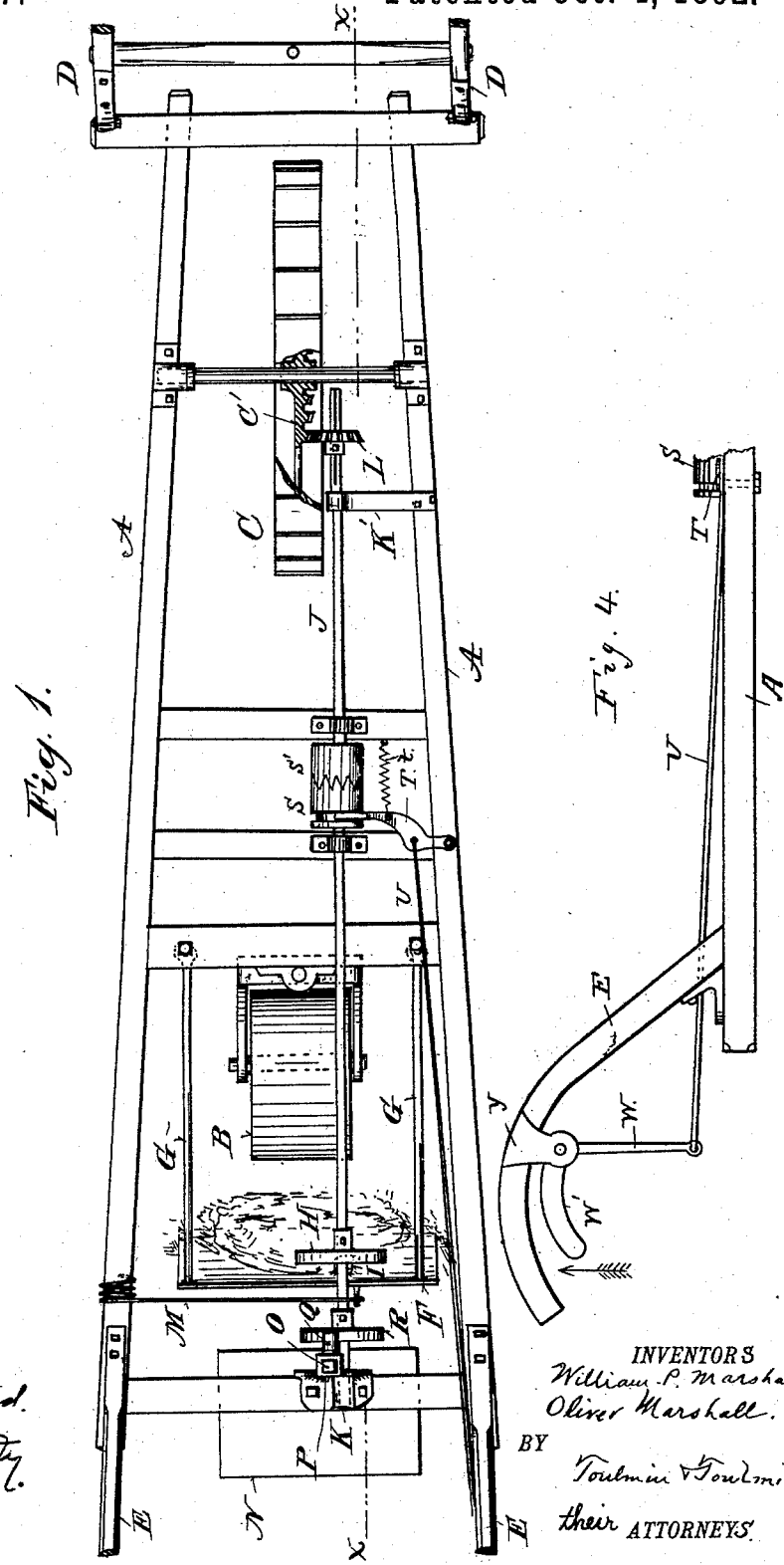

UNITED STATES PATENT OFFICE.

WILLIAM P. MARSHALL AND OLIVER MARSHALL, OF DAYTON, OHIO.

TOBACCO-HILLER.

SPECIFICATION forming part of Letters Patent No. 483,567, dated October 4, 1892.

Application filed May 31, 1892. Serial No. 434,912. (No model.)

*To all whom it may concern:*

Be it known that we, WILLIAM P. MARSHALL and OLIVER MARSHALL, citizens of the United States, residing at Dayton, in the county of Montgomery and State of Ohio, have invented certain new and useful Improvements in Tobacco-Hillers, of which the following is a specification, reference being had therein to the accompanying drawings.
This invention relates to certain new and useful improvements in tobacco-hillers.

The object of our invention is to provide means for scraping up a certain amount of earth from the ground and to flatten the earth thus collected in order to form a hill suitable for the reception of tobacco-plants.

To this end our improvements have reference to a scraper or hoe adapted to be operated up and down, to a cam effecting such movement of the hoe to and from the ground, to a patter or flattening piece adapted to pat or flatten the hill of dirt collected by the hoe, to a cam-actuating mechanism for such patter, to driving mechanism for operating said hoe and patter automatically and relatively to each other, to adjusting the speed of such driving mechanism to form a hill at greater or less distances apart, and to other points, hereinafter described and claimed.
In the accompanying drawings, on which like reference-letters indicate corresponding parts, Figure 1 represents a plan view of my machine with portions broken away; Fig. 2, a longitudinal sectional view along the line X X of Fig. 1, and Fig. 3 a transverse sectional view along the line $y\ y$, Fig. 2. Fig. 4 is a detached view of a part of the frame and one of the handles of the machine.

The letter A designates a framework suitably braced and mounted on a wide-faced caster-wheel B and a wheel C, provided with corrugations to engage with the ground and adapt it to be used as a driving-wheel, as hereinafter described. Thills D are attached to the forward end of the frame, whereby a horse may be attached. The rear end of the frame is provided with handles E for guiding the machine, the caster-wheel allowing of readily changing the direction of travel.
Near the rear end of the frame is a hoe or scraper F, supported by rods G or otherwise connected to the frame to allow it of being adjusted to and from the ground and collect a quantity of dirt corresponding to its engagement with the ground or the length it travels in contact therewith. One means of effecting this engagement is by a cam H, engaging with the roller projection I on the hoe or scraper and mounted on a shaft J, carried on brackets K K' on the frame of the machine. The forward end of this shaft is provided with a bevel-gear L, meshing with a gear-faced disk C', integral with or otherwise supported by the driving-wheel C. This disk is preferably formed in concentric toothed rings or ridges, whereby the shaft J may be rotated at different speeds, according to the engagement of the bevel-gear L with the different sizes of rings or ridges of the disk.
The shaft J is divided into two parts near the middle of its length, and each part is provided with a clutch S S', which may be thrown in and out of gear by means of the bifurcated lever T, the outer end of which is pivoted to one of the frames A of the machine. This lever is kept in its normal position by spring $t$, one end of said spring being attached to one of the cross-pieces of frame A, the other end to the lever, as shown in Fig. 1. This lever is actuated by means of a rod U, pivoted thereto and extending backwardly to the lower end of bell-crank lever W, having the handle W', pivoted to a bracket Y, attached to one of the handles E of the machine. When the handle W' is pressed in the direction of the arrow, the lever T is drawn backwardly and throws the clutch S out of gear with the clutch S'. The cam H is provided with a sharp change of contour at $h$ and a gradually-widening bearing-face from near the center to the outer front. It thus gradually forces the hoe toward and into the ground till it reaches the position shown in Fig. 3. A spring M is engaged with the hoe or scraper F and raises the same out of the ground when the roller I passes the toe of the cam. The collected dirt is thus left in a mound or hill, rounded or irregular on top. To adapt it for tobacco planting, this hill should be flattened, and this we do by means of a flattener or patter, consisting of a plate N, carried by a support in the form of a reciprocating rod O, mounted in guides P on the frame of the machine. This patter may be otherwise mounted and of different construction, if so desired, and we wish to be understood as laying claim, broadly, to the means for flattening the hill. We do not therefore limit ourselves to any special construction in accomplishing this result. In the form illustrated, however, the rod O carries an antifriction-roller Q, engaged by a cam R, mounted on the shaft J. A set-screw or other means allows of adjusting this cam with relation to the cam H. The two cams are substantially similar in outline, each being provided with a sharp change of contour and a gradual approach or bearing-face at each end thereof. They may vary in size, however, as may be convenient. The cams allow the hoe to be raised from the ground and a little later the patter to descend upon the hill as the travel of the machine brings it over the same in this construction. This is indicated by dotted lines in Fig. 3.

It will thus be seen that the dirt is collected into a hill and is flattened on top and the hills are located at predetermined distances apart, all being done automatically in the travel of the machine and only requiring the guidance of the machine by the driver. Much saving of time and labor is thus secured and resulting economy of work obtained with better results.

We wish to be understood as laying broad claim to the patter or flattener for the hill and to the adjustable scraper or hoe operating therewith whatever the driving mechanism employed to operate them, and likewise to the cam mechanism exemplifying this invention. While the patter is shown as actuated by gravity in its descent, other means for effecting a sufficient flattening action may be employed.

Having thus fully described our invention, what we claim as new, and desire to secure by Letters Patent, is—

1. In a tobacco-hiller, the combination, with a carrying-frame, of a scraper or hoe connected therewith and operating to and from the ground, and means to effect such operation of the hoe, and patter to flatten the hill collected by said scraper.

2. In a tobacco-hiller, the combination, with a frame and carrying-wheels, one acting as a driver, of a scraper or hoe to collect a hill, a patter to flatten said hill, cams operating said scraper and patter, respectively, and operative connections between said cams and driving-wheel, to effect the automatic action thereof.

3. In a tobacco-hiller, the combination, with driving and carrying wheels, of a patter consisting of a flattening-plate and a reciprocating rod supporting said plate, a cam having a sharp change of contour and adapted to lift said patter and allow its descent on the hill beneath, a shaft for said cam, and gear connections between said shaft and driving-wheel to effect such operation of the patter at predetermined intervals.

4. In a tobacco-hiller, the combination, with a frame carrying a driving-wheel, of a scraper or hoe having arms or extensions connected at one end to said frame, whereby the hoe or scraper may be adjusted to and from the ground, a spring tending to lift the hoe or scraper, a cam having a sharp change of contour and acting to depress said scraper or hoe and allow the action of the spring, a shaft for said cam, and adjustable gear connections with said driving-wheel to vary the speed of said shaft and the intervals between said lifting of the hoe.

5. In a tobacco-hiller, the combination, with a frame having a driving-wheel at one end and a caster-wheel near the other end, both wheels supporting the said frame, of a hoe or scraper hung to said frame in the rear of said caster-wheel and a patter mounted in the rear of said hoe or scraper, adjustable cam mechanism acting on said hoe and patter to allow the raising of the hoe and descent of the patter correspondingly, and means to connect said driving-wheel with said cam mechanism to effect such operation.

6. In a tobacco-hiller, the combination, with a frame, a driving-wheel, and a carrying-wheel for said frame, of a swinging scraper and a reciprocating patter to collect and flatten a hill, respectively, a driving-shaft and gear slidingly mounted thereon, a toothed disk on said driving-wheel adapted to be engaged by said gear to vary the speed of said shaft, and cam-actuating means to operate said scraper and patter successively.

7. In a tobacco-hiller, the combination, with a frame and a supporting-wheel near one end and a caster-wheel near the other end, the supporting-wheel being provided with a gear-faced disk, of a shaft, a bevel-gear slidingly mounted thereon and adapted to be engaged with said disk on the driving-wheel at different distances from the center, cam devices carried by said shaft, a scraper, and a patter or flattener respectively operated by said cam devices.

In testimony whereof we affix our signatures in presence of two witnesses.

WILLIAM P. MARSHALL.
OLIVER MARSHALL.

Witnesses to signature of William P. Marshall:
   A. BURTON COLLAR,
   H. M. PLAISTED.
Witnesses to signature of Oliver Marshall:
   GEORGE H. WOOD,
   R. JAY MCCARTY.